July 24, 1951     L. R. NELSON     2,562,116
HOSE COUPLING
Filed Dec. 11, 1947
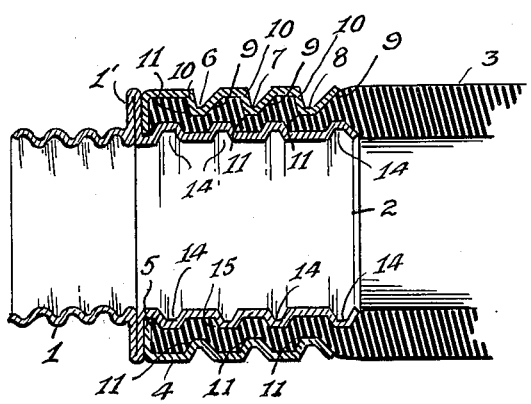
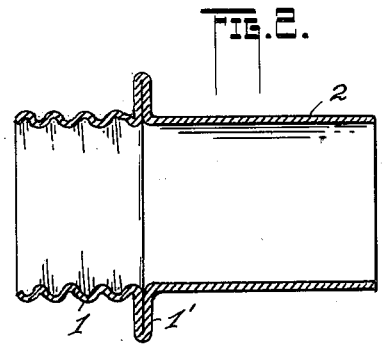
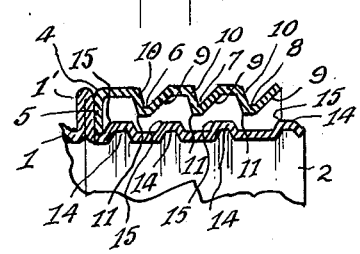
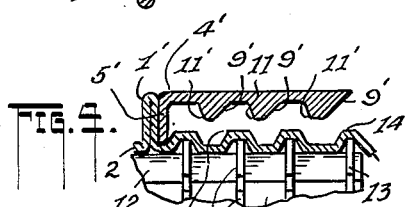
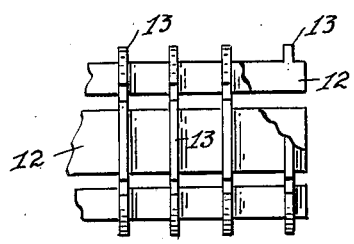
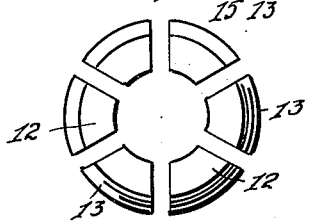
Inventor
L. R. Nelson,
By L. M. Thurlow
Attorney Patented July 24, 1951

2,562,116

UNITED STATES PATENT OFFICE 2,562,116

HOSE COUPLING

Lewen R. Nelson, Peoria, Ill.

Application December 11, 1947, Serial No. 791,125

5 Claims. (Cl. 285—77)

This invention pertains to a method of connecting a hose to a hose fitting, as well as the article produced by such method.

The purpose is to provide a method for attaching to a hose coupling a hose of any type, but especially a hose made from plastics or rubber composition, which has no reinforcement such as braided cotton, and which under pulling strain tends to slip or ooze and work free of such holding attachments as have previously been found satisfactory for a hose of the reinforced type.

An important object of the invention is a method of employing an outer ferrule enclosing the hose-end and having an inturned flange extending over the end wall of the hose, and also having an annular inturned portion at the hose-receiving end thereof, and an inwardly extending portion substantially midway of the length of said ferrule between said end inturned portion and said inturned flange. In addition to this a tubular part or shank is introduced into the bore of said hose-end, followed by expanding the same throughout its length, and further, expanding annular wall portions from the outer circumference thereof to compress the hose between said tubular part or shank and the ferrule, and to provide frictional shoulders on the ferrule and the shank lying opposite recesses in each tubular part for engaging the wall of the hose, as a novel structure, to prevent withdrawal of the hose from the coupling by pulling strains thereon in use.

In certain types of hose, particularly those made from plastics, it has been found that great pressure must be exerted in expanding the inner tubular part against the ferrule in order to force the hose material into a compact hardened mass. However, the required pressure tends to bulge the walls of said ferrule, which usually, for reasons of economy, is made from light weight thin sheet metal, or from other tubing such as rod machined tubing, also having thin walls, and that the full value of said internal pressure is not secured by reason of said bulging and also due to the limited expansion allowed the expanding means employed within the said shank.

An important object is to reenforce the ferrule walls between the ends thereof by means of inwardly extending annular wall portions, part of each of which lies substantially at right angles the bore of the ferrule and which has a relatively sharp corner nearest the axis of the ferrule-bore, while also providing wall portions on the tubular part or shank of the coupling, the wall portions of one of the members lying in the recesses between the wall portions of the other member, the whole compressing the bore material and offering the greatest resistance to the movement or flow thereof, and providing a maximum of resistance to any force tending to pull or withdraw the hose from the coupling.

A further object is to provide easy entrance into the ferrule of the hose-end, which latter may have slightly variable outside diameters. While the said substantially right angular inwardly extending wall portions offer the greatest resistance to pulling the hose from the ferrule the opposite wall thereof lies at a sloping angle inwardly so that the hose is permitted free guided entrance.

A further object is to supply within the limited space in the length of the ordinary commercial coupling tubular extension or shank, a series of short restricted hose receiving recesses so as to allow closer compression of the hose segments within the said recesses, thus rendering the compressed and hardened hose portions less liable to give or loosen under pulling strain.

In actual construction, the inturned portions and inturned flange of the ferrule may be formed from a sheet metal blank of "cup" form by the usual process of forming and spinning, or said ferrule may be made from a rod or tubing, the inturned flange being cut from solid metal or formed by a process of cutting and spinning inwardly, the annular inturned portions and recesses being cut from the solid stock if that method is desired.

That the invention may be fully understood the accompanying drawing is provided forming part hereof.

Figure 1 is a longitudinal section of a hose end and a fitting, showing the arrangement of securing parts according to the present invention.

Figure 2 is a longitudinal section of a tubular part or shank of a hose fitting prior to processing.

Figure 3 is a longitudinal section of parts shown in Figure 1.

Figure 4 is a longitudinal section of the shank of a hose fitting together with a ferrule of machined type as compared with a ferrule shown in Figure 1.

Figure 5 is a side elevation of an expanding tool, and

Figure 6 is an end elevation of said tool.

In Figure 1 a hose fitting is identified at 1, this having any usual encircling flange 1', and also including a normally cylindrical shank or sleeve 2, while 3 denotes a plastic hose encompassed at its end by the ferrule 4.

In the present instance said ferrule at its end adjacent said flange 1' has an inturned flange 5 encircling the shank 2 and lies in a plane paralleling said flange 1' to abut the same.

The ferrule 4 is formed with spaced annular portions 6, 7 and 8, extending into the bore thereof and lying approximately perpendicular to the axis of bore. Each of said portions has a substantially straight wall portion 9 each lying at an angle to the axis of said bore of said ferrule, being directed toward said axis away from the open end of said ferrule or that end thereof most distant from the flange 5, as best shown in Figure 3. Also, it is observed in the figure just named that the walls 10 of said portions 6, 7 and 8 lie approximately perpendicular to the bore axis and terminate in a more or less sharp or abrupt abutment or corner 11 within the bore.

In placing the ferrule upon the hose-end it will be seen that the long angular surfaces of the walls 9 offer little resistance to the entrance of the soft hose in pushing the same into ferrule to its seated position against flange 5 of the latter.

Considering, now, the fitting 1 whose shank or sleeve 2 is normally smooth throughout, as in Figure 2, it is clear that this may be readily inserted into the bore of the hose, the flange 1' thereof being placed in abutment with the said flange 5 of the ferrule, whereupon the structure may receive into it an expanding arrangement of a desired type. In the present instance this may comprise a series of segments 12, Figures 4, 5 and 6, which may be forced radially outward, the flanges 13 of which, as to their operating surfaces, being such, and so spaced, as to engage and expand portions of the shank 2.

In Figure 1, see also Figure 4, it is noted that said normally smooth shank when operated upon by the flanges 13 of the segments 12 is changed in form to enlarge the bore of the shank while creating a series of inwardly extended spaced enlargements 14 which, in this instance, are staggered in position in respect to the previously described portions 6, 7 and 8 of the ferrule 4. One of these enlargements lies opposite a recess between the flange 5 and the portion 7 of the ferrule and may abut said flange.

Another enlargement 14 lies opposite a recess between the portions 6 and 7, and still another enlargement lies opposite a recess between the portions 7 and 8 of said ferrule, while an enlargement 14 lies outward from the said portion 8, the several flanges 13 of the expanding arrangement being so placed as to provide the proper spaced positions of such enlargements.

In thus acting upon the shank the enlargement nearest the flange 5 in abutting that member serves as a lock to prevent lognitudinal movement of said shank and ferrule relatively.

It is to be noted that since the flange 5 of the ferrule overlies the end wall of the hose, and since said flange terminates in close relation to the shank 2, the soft plastic is prevented oozing from its position at any point.

Attention is directed to the fact that at 15 each enlargement 14 of the shank a more or less sharp or abrupt corner is provided as counterparts of the sharp corners 11 of the ferrule 4.

While in Figure 1 the ferrule is shown as one of sheet metal preformed to provide the portions 6, 7 and 8, there is also shown a ferrule of substantially the same form in Figure 4 as to such portions, but in this instance the ferrule is of a machined type, or produced from tubular stock wherein the flange 5', corresponding to 5 in said Figure 1, may be either machined, or produced by spinning operations, the inwardly formed parts corresponding to those in Figure 1 but are designated by allied characters to distinguish from the characters of the figure last named, while having sharp corners 11' as before.

In the present instance two of the annular portions 6 and 7 are employed between the flange 5 and the terminal portion 8 of the ferrule 4. However, even though the ferrule walls are somewhat thin as previously stated, a single annular portion may suffice to lend enough strength to said walls from the fact that such single portion naturally sets up great resistance to such inwardly applied pressures as are required in dealing with a hose of plastic material.

The expanding operation is such as to tightly compress the hose material, in that its thickness as thus compressed is much less than its thickness when it lies outside the fitting 2 but this, of course, is common practice. In this instance, however, the formed metal of the shank has imprisoned the hose material and has "keyed" it between the portions 6 of the ferrule and the enlargement 14 of the shank nearest said flange 5, and between the wall 10 and the said enlargement as well as between the other enlargement and portions 7 and 8 as an important circumstance, the sharp corners of inner walls of the recesses formed in the ferrule setting up a strong resistance to movement of the solidly packed hose material which is forced into said recesses by the enlargements of the expanded shank, and held by their own sharp corner 15.

The angular walls 9 of the ferrule serve to more readily permit the capping of the hose by the more ready entrance of the latter thereinto, and important is the fact that they aid in fixing the hose in position by lying opposed to the described enlargements of the shank. In addition to this "keying" at the flange 5 and enlargement 14 it is observed that by reason of the opposing portions 6, 7 and 8 and enlargements 14 in their staggered relation a tortuous recess is created for the plastic as a further setting up of a resistance to pulls on the hose.

The flange 5 serves advantageously to prevent endwise movement of the ferrule and shank relatively, as already stated, and by having abutment with the enlargement 14 nearest it assists in preventing the said endwise movement no matter how strong a pull on the hose might be, and by having the sharp corners 11 and 15 engaged in the hose the latter resists any such pull and its withdrawal from the assembled parts is positively prevented.

However, in respect to the employment of the flange 5 it may be said that where the plastic hose has been placed under great pressure in the expanding act its hard compact body may become highly resistive to change in form and thereby the ferrule and shank may thus be firmly secured relatively without respect to the flange, perhaps, and could withstand pulling strain of the nature mentioned herein.

I claim:

1. Means securing a pliable hose to a hose fitting comprising in combination a hose fitting element including a shank for engaging the end portion of the hose, and a ferrule adapted to engage the end portion of the hose to clamp said end portion between said ferrule and shank, said ferrule having a plurality of spaced annular inwardly directed hose compressing portions each having a substantially flat first wall facing the extremity of the hose clamped between said ferrule and shank, an inner second wall substantially parallel with the body of said ferrule and forming with said first wall an abrupt corner facing said extremity of the hose, and a third wall facing away from said extremity of the hose and defining with the body of said ferrule an acute angle opening toward said extremity of the hose, and said shank having a plurality of spaced annular hose compressing portions displaced from the plane of said shank toward said ferrule and each being situated opposite a space between two of said hose compressing portions of said ferrule.

2. Means of the type described constructed in accordance with claim 1, wherein the wall of one of said hose compressing portions of said ferrule facing away from said extremity of the hose constitutes the end of said ferrule most distant from said extremity of the hose.

3. In combination, a hose fitting element including a shank and an annular flange directed transversely of said shank, a ferrule arranged coaxially with said shank and including an annular transverse flange lying against the flange of said fitting element, the combination of said shank, said ferrule and said flange of said ferrule defining an annular hose receiving space closed at one end by said flange of said ferrule, and a pliable plastic hose inserted in said space with the hose end abutting said flange of said ferrule, said ferrule including a plurality of spaced annular hose compressing portions displaced from the plane of said ferrule toward said shank and each having a substantially flat first wall facing said flange of the ferrule and lying substantially at right angles to the body of said ferrule, a second wall substantially parallel with the body of said ferrule and joining said first wall to form an abrupt annular corner directed toward said flange of the ferrule, and a third wall facing toward the open end of said hose receiving space and forming with the body of said ferrule an acute angle opening toward said flange, and said shank having a plurality of spaced annular hose compressing portions directed toward said ferrule and each situated opposite a space between two of said hose compressing portions of said ferrule.

4. In combination, a male hose fitting element including a shank and an annular flange directed outwardly from said shank, a ferrule surrounding said shank and including an annular flange extending inwardly to said shank and lying against the flange of said fitting element, the combination of said shank, said ferrule and said flange of said ferrule defining an annular hose-receiving space closed at one end by the flange of said ferrule, and a pliable hose inserted in said space with the hose end abutting the flange of said ferrule, said ferrule including a plurality of spaced annular inwardly directed hose compressing portions each having a substantially flat first wall facing said flange of the ferrule and lying substantially at right angles to the body of said ferrule, a second wall substantially parallel with the body of said ferrule and joining said first wall to form an abrupt corner directed toward said flange of the ferrule, and a third wall facing toward the open end of said hose receiving space and forming with the body of said ferrule an acute angle opening toward said flange, and said shank having a plurality of spaced annular outwardly directed hose compressing portions each situated opposite a space between two of said inwardly directed hose compressing portions of said ferrule, the third wall of one of said inwardly directed hose compressing portions of said ferrule constituting the end of said ferrule opposite said flange of said ferrule.

5. In combination, a male hose fitting element including a shank and an annular flange extending outwardly from said shank, a ferrule surrounding said shank and including an inturned flange lying against the flange of said fitting element and extending to the outer surface of said shank, the combination of said shank, said ferrule and said inturned flange defining an annular hose-receiving space closed at one end by the flange of said ferrule, and a pliable hose inserted in said space with the hose end abutting said inturned flange of said ferrule, said ferrule having a plurality of spaced annular inwardly deformed portions constituting hose compressing elements each having a first wall lying substantially at right angles to the body of said ferrule and facing said inturned flange, a second wall substantially parallel with the body of said ferrule and joining said first wall to form an abrupt continuous annular corner facing said inturned flange, and a third wall facing the open end of said hose receiving space and forming with the body of said ferrule an acute angle opening toward said inturned flange, and said shank having a plurality of spaced annular outwardly extending hose compressing elements each situated opposite a space between two of said inwardly deformed hose compressing elements of said ferrule, the end of said ferrule opposite said inturned flange comprising a flange slanting outwardly and away from said inturned flange and constituting said third wall of one of said inwardly deformed hose compressing elements.

LEWEN R. NELSON.

REFERENCES CITED

The following references are of record in the file of this patent:

UNITED STATES PATENTS

| Number | Name | Date |
|---|---|---|
| 1,786,489 | Hopkins | Dec. 30, 1930 |
| 1,965,426 | Nelson | July 3, 1934 |
| 2,142,752 | Howard | Jan. 3, 1939 |
| 2,228,018 | Scholtes | Jan. 7, 1941 |
| 2,321,991 | Butler | June 15, 1943 |
| 2,399,790 | Conroy | May 7, 1946 |